US006287630B1

(12) United States Patent
Strange et al.

(10) Patent No.: US 6,287,630 B1
(45) Date of Patent: Sep. 11, 2001

(54) POLYMER ELECTROLYTE WITH ENHANCED IMPREGNATION

(75) Inventors: Thomas F. Strange, Easley; Timothy R. Marshall, Pickens, both of SC (US)

(73) Assignee: Pacesetter, Inc., Sunnyvale, CA (US)

( * ) Notice: Subject to any disclaimer, the term of this patent is extended or adjusted under 35 U.S.C. 154(b) by 0 days.

(21) Appl. No.: 09/312,202

(22) Filed: May 14, 1999

(51) Int. Cl.$^7$ .................................................. B05D 5/12
(52) U.S. Cl. ..................... 427/80; 427/81; 427/372.2; 427/384; 29/25.03
(58) Field of Search ................... 427/79, 80, 81, 427/372.2, 384; 29/25.03, 25.41

(56) References Cited

U.S. PATENT DOCUMENTS

| | | | |
|---|---|---|---|
| 4,942,501 | 7/1990 | MacFarlane et al. | 361/523 |
| 5,086,374 | 2/1992 | MacFarlane et al. | 361/525 |
| 5,146,391 | 9/1992 | MacFarlane et al. | 361/525 |
| 5,153,820 | 10/1992 | MacFarlane et al. | 361/525 |
| 5,628,801 | 5/1997 | MacFarlane et al. | 29/25.03 |
| 5,748,439 | 5/1998 | MacFarlane et al. | 361/525 |
| 6,086,642 * | 7/2000 | Fukaumi et al. | 29/25.03 |

* cited by examiner

*Primary Examiner*—Brian K. Talbot
(74) *Attorney, Agent, or Firm*—Steven M. Mitchell

(57) ABSTRACT

The present invention relates to an improved method of impregnating electrolytic capacitor stacks or wound rolls with a polymer electrolyte such as a hydroxyethylmethacrylate (HEMA) or hydroxyethylacrylate (HEA) based polymer electrolyte, to render them suitable for use in electrolytic capacitors, and to such electrolytic capacitors. The initiator to promote the polymerization of this electrolyte is deposited on the foil or in the stack or wound roll prior to impregnation of the polymer electrolyte, allowing the electrolyte to be warmed to a temperature suitable for easy impregnation into the anode and cathode foil and paper.

10 Claims, No Drawings

POLYMER ELECTROLYTE WITH ENHANCED IMPREGNATION

BACKGROUND OF THE INVENTION

1. Field of the Invention

The present invention relates to an improved method of impregnating electrolytic capacitor stacks or wound rolls with a polymer electrolyte, such as a hydroxyethylmethacrylate (HEMA) or hydroxyethylacrylate (HEA) based polymer electrolyte, to render them suitable for use in electrolytic capacitors, and to such electrolytic capacitors.

2. Related Art

Conventionally, an electrolytic capacitor includes an etched aluminum foil anode, an aluminum foil or film cathode, and an interposed kraft paper or fabric gauze separator impregnated with a solvent-based liquid electrolyte. Typically, the electrolytic or ion-producing component of the electrolyte is a salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, composing a planar, layered, stack structure of electrode materials with separators interposed therebetween.

Typically, the separator is impregnated with a polymer electrolyte, such as a HEMA based polymer electrolyte. In known processes for impregnating electrolytic capacitor stacks or wound rolls with a polymer electrolyte, such as a HEMA based polymer electrolyte, a polymerization initiator is mixed with the electrolyte prior to impregnation. For example, U.S. Pat. No. 5,628,801 discloses an electrolytic capacitor where a separator impregnated with an elastomeric solid electrolyte is utilized in the dual capacity of electrolyte and adhesive material to hold together the anode and cathode plates of the capacitor. The preferred electrolyte consists of: 17.5 parts of hydroxyethylmethacrylate, 32.5 parts ethylene glycol, 7.0 parts ammonium adipate, 6.7 parts ammonium glutarate, 0.45 parts tetraethyleneglycodiacrylate, and 2.2 parts of initiator solution. The capacitor assembly is impregnated with this polymerizable liquid electrolyte/adhesive and then heated to approximately 55° C. for at least 2 hours, but preferably 24 hours to cure the electrolyte/adhesive.

Similarly, U.S. Pat. No. 5,748,439 discloses an electrolytic capacitor having interposed between the electrically conductive anode and cathode layers thereof a spacer comprised of a mechanical separator means such as kraft paper impregnated with a crosslinked elastomeric electrolyte. The electrolyte is preferably made up as a liquid prepolymer electrolyte mixture prior to impregnation into the capacitor element and the polymer is preferably formed in situ thereafter from the prepolymer mixture. The mixture is preferably made up by first dissolving a salt into a liquid plasticizer component by stirring at elevated temperatures, cooling the mixture to room temperature, and then adding to the mixture a monomer corresponding to the desired polymer and a crosslinking agent, as well as a polymerization initiator.

However, mixing the initiator with the electrolyte prior to impregnation, as disclosed in both of these patents, has the disadvantage of shortening the working life of the electrolyte, and making impregnation into fine structures and between anode plates difficult, due to the inherent higher viscosity at room temperature.

Heating the electrolyte to reduce viscosity, a common practice in the industry, only serves to hasten the curing of the polymer and thus defeats the intended purpose.

SUMMARY OF THE INVENTION

The present invention provides for an improved method of impregnating electrolytic capacitor stacks or wound rolls with a polymer electrolyte, such as a HEMA or HEA based polymer electrolyte. For example, the polymer electrolyte according to the present invention may consist of an ethylene glycol solvent base with a suitable anionic salt dissolved or dispersed throughout and has 20 to 60% HEMA as a cosolvent or dispersant. The initiator to promote the polymerization of this electrolyte is deposited on the foil or in the stack or wound roll prior to impregnation of the polymer electrolyte, allowing the electrolyte to be warmed outside the stack or wound roll before impregnation to a temperature suitable for easy impregnation into the anode and cathode foil and the kraft paper.

By having the initiator separate from the electrolyte, and locating the initiator in intimate contact with the areas where polymerization is desired (as in the anode foil tunnels, paper, or cathode structure), the polymer electrolyte can be heated, prior to impregnation, to any desired temperature up to 95° C., without hastening the curing of the polymer, and then impregnated into the initiator treated stack or wound roll, thus allowing full impregnation.

Accordingly, the present invention provides improved methods and compositions for impregnating electrolytic capacitor stacks or wound rolls, as well as electrolytic capacitors comprising the stacks or wound rolls.

DETAILED DESCRIPTION OF THE INVENTION

The present invention provides an improved method of impregnating electrolytic capacitor stacks or wound rolls with a polymer electrolyte, such as a HEMA or HEA based polymer electrolyte, wherein the polymerization initiator is separated from the polymer electrolyte, thus allowing full impregnation.

In the method of the present invention, the stack or wound roll is first impregnated with a polymerization initiator. The polymerization initiator is preferably a solution consisting of an aqueous solution of persulfate ($S_2O_8^{-2}$) compound along with a miscible organic solvent of high vapor pressure such as acetone, methanol, toluene or ethanol. Other examples of free radical initiators that may also be used are 2,2' azobisisobutyronitrile (AIBN) or benzoyl peroxide.

After impregnation of the stack or wound roll with the polymerization initiator, the stack or wound roll is dried under vacuum to remove the water and organic solvent at temperatures of 20 to 50° C. The stack or wound roll is then placed in an environment with a reduced oxygen concentration, preferably of 4% or less, for example, a glove box filled with an inert gas such as argon.

Next, the polymer electrolyte is prepared. The polymer electrolyte can be chosen from among the various polymer electrolytes used in electrolytic capacitors known to those skilled in the art. For example, the polymer electrolyte may be chosen from among the family of acrylate monomers, such as hydroxyethylmethacrylate (HEMA) or hydroxyethylacrylate (HEA). In one embodiment, a solution of an ethylene glycol based electrolyte is mixed with the HEMA and up to 1% of a compound capable of crosslinking with HEMA/HEA, preferably tetraethyleneglycodiacrylate (TEGDA) with a ratio between 20% and 60% by weight HEMA and heated to a temperature in the range of 50 to 90° C., preferably to 70° C.

The stacks or wound rolls are placed in a vacuum chamber and the pressure is reduced to a suitable vacuum of 26 to 29 inches of mercury, preferably 27 inches, to remove the trapped gases. Once this has occurred, the stacks or wound rolls are placed in contact with the heated electrolyte solution and the inert atmosphere is allowed back into the chamber. The atmospheric pressure pushes the heated electrolyte into the microscopic structures inherent to the anode and cathode foils and paper where the initiator has been previously impregnated.

The stack or wound roll is then placed into a heated environment, which excludes the presence of oxygen, at temperatures of 50° C. to 100° C. until the polymerization is completed.

The process of the present invention results in a fully impregnated stack or wound roll. Thus, stacks or wound rolls impregnated in accordance with the present invention can be used in high voltage electrolytic capacitors and can yield a significantly higher working life.

The present invention thus also provides for electrolytic capacitors comprising stacks or wound rolls impregnated by methods and/or compositions according to the present invention. Such capacitors can be made using any suitable method known in the art. Non-limiting examples of electrolytic capacitors and methods of their manufacture are disclosed, e.g., in the following references which are entirely incorporated herein by reference: U.S. Pat. Nos. 5,814,082 to Fayram et al., 5,801,917 to Elias, 5,131,388 to Pless, et al., and 4,593,343 to Ross.

Having now generally described the invention, the same will be more readily understood through reference to the following examples which are provided by way of illustration, and are not intended to be limiting of the present invention.

EXAMPLE 1

A solution consisting of 12 g HEMA, 0.8 ml $K_2S_2O_{8(sat.)}$ and 19.2 g of an electrolyte solution containing 1% TEGDA was mixed and some was used to fill a capacitor at room temperature. The rest was heated to 60° C. The viscosity of the heated solution increased visibly. The heated solution was used to fill the remaining two capacitors. After fifteen minutes of vacuum, the capacitors were placed with the excess PE into plastic bags and put into a 85° C. oven.

This experiment showed that when the electrolyte/TEGDA solution with persulfate was heated to reduce viscosity, polymerization occurs, as expected.

EXAMPLE 2

As in Example 1, a solution was prepared consisting of 12 g HEMA and 19.2 g of an electrolyte containing 1% TEGDA. In this experiment, however, no persulfate was added. The solution was heated to 75° C. in a glove box. No polymerization was observed, until 0.4 ml of $K_2S_2O_{8(sat.)}$ was added. Thereafter, two capacitors were impregnated with the solution and viscosity increased rapidly during pumping under vacuum. The capacitors were placed into oven at 75° C.

This experiment showed that when the electrolyte/TEGDA solution without persulfate is heated to reduce viscosity, no polymerization occurs until persulfate is added, proving that persulfate is an essential catalyst to polymerization.

EXAMPLE 3

In this experiment, 0.4 ml of $K_2S_2O_{8(sat.)}$ was mixed with 16 ml acetone. Two capacitors were impregnated with the persulfate solution, pumped under vacuum and dried in an oven. They were then pumped again to remove all traces of acetone. The capacitors were then filled with 9.6 g of a 65° C. electrolyte/TEGDA solution and 6.0 g HEMA. This solution showed no sign of polymerization until small amounts of $S_2O_8^{-2}$ leaked out from the fill hole. The capacitor was then placed into an oven at 75° C. for several hours.

This experiment showed that the method according to the present invention allows the electrolyte/TEGDA solution to be heated, to reduce viscosity, making the electrolyte/TEGDA solution suitable for easy impregnation into the anode and cathode foil and paper, without hastening the curing of the polymer. On disassembly of the capacitors, complete polymerization was observed. By impregnating the capacitor first with persulfate, the electrolyte/TEGDA solution can be heated outside the capacitor and then impregnated without polymerization occurring outside the capacitor.

All references cited herein, including journal articles or abstracts, published or corresponding U.S. or foreign patent applications, issued U.S. or foreign patents, or any other references, are each entirely incorporated by reference herein, including all data, tables, figures, and text presented in the cited references.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A process for impregnating an electrolytic capacitor stack or wound roll, comprising:

1. impregnating said stack or wound roll with a polymerization initiator;
2. heating a polymer electrolyte solution;
3. contacting said stack or wound roll with said heated polymer electrolyte solution; and
4. curing said polymer, wherein said step 2 is performed prior to said step 3 to reduce the viscosity of said polymer electrolyte without substantially hastening the curing of said polymer electrolyte.

2. A process according to claim 1, wherein said polymerization initiator is a solution consisting of an aqueous solution of an initiator compound, along with a miscible organic solvent.

3. A process according to claim 2, wherein said initiator compound is a persulfate ($S_2O_8^{-2}$).

4. A process according to claim 1, wherein said polymer electrolyte solution is a hydroxyethylmethacrylate (HEMA) or hydroxyethylacrylate (HEA) based polymer electrolyte solution.

5. A process according to claim 4, wherein said HEMA or HEA based polymer electrolyte solution is a solution of an ethylene glycol based electrolyte mixed with HEMA or HEA and a crosslinking compound.

6. A process according to claim 5, wherein said crosslinking, compound is tetraethyleneglycodiacrylate (TEGDA).

7. A process according to claim 5, wherein said HEMA or HEA based polymer electrolyte solution has a ratio between 20% and 60% by weight HEMA or HEA.

8. A process according to claim 5, wherein said HEMA or HEA based polymer electrolyte solution has no more than 1% of said crosslinking compound.

9. A process according to claim 4, wherein said HEMA or HEA based polymer electrolyte solution is heated to a temperature of 90° C. before impregnating said stack or wound roll.

10. A process for impregnating an electrolytic capacitor stack or wound roll, comprising 1. impregnating said stack or wound roll with a polymerization initiator
2. drying said stack or wound roll under a vacuum at a temperature of 20 to 90° C.
3. placing said stack or wound roll in an environment with an oxygen concentration not more than 4%
4. preparing a polymer electrolyte solution and heating said solution to a temperature of 90° C.
5. placing said stack or wound roll in a vacuum chamber and reducing the pressure to a suitable vacuum to remove trapped gases
6. contacting said stack or wound roll with said heated polymer electrolyte solution and allowing the inert atmosphere back into the chamber so that the atmospheric pressure pushes said heated polymer electrolyte into the microscopic structures inherent to said stack or wound roll where said polymerization initiator has been previously impregnated
7. placing said stack or wound roll into a heated environment which excludes the presence of oxygen at a temperature of 50° C. to 100° C. for a minimum of one hour until the polymerization of said polymer electrolyte has fully taken place.

* * * * *